United States Patent
Raman et al.

(10) Patent No.: US 7,984,110 B1
(45) Date of Patent: Jul. 19, 2011

(54) METHOD AND SYSTEM FOR LOAD BALANCING

(75) Inventors: Sundar Raman, Arlington Heights, IL (US); Michael S. Borella, Naperville, IL (US)

(73) Assignee: Hewlett-Packard Company, Palo Alto, CA (US)

( * ) Notice: Subject to any disclaimer, the term of this patent is extended or adjusted under 35 U.S.C. 154(b) by 614 days.

(21) Appl. No.: 10/004,116

(22) Filed: Nov. 2, 2001

(51) Int. Cl.
*G06F 15/16* (2006.01)

(52) U.S. Cl. ....................................................... 709/217

(58) Field of Classification Search .......... 709/217–219, 709/223–229; 718/102–105
See application file for complete search history.

(56) References Cited

U.S. PATENT DOCUMENTS

| | | | |
|---|---|---|---|
| 5,603,029 A * | 2/1997 | Aman et al. .................. 718/105 |
| 5,884,038 A * | 3/1999 | Kapoor .......................... 709/226 |
| 6,128,279 A * | 10/2000 | O'Neil et al. ................. 370/229 |
| 6,185,619 B1 * | 2/2001 | Joffe et al. ..................... 709/229 |
| 6,249,800 B1 * | 6/2001 | Aman et al. .................. 718/105 |
| 6,314,447 B1 * | 11/2001 | Lea et al. ....................... 718/105 |
| 6,314,465 B1 * | 11/2001 | Paul et al. ...................... 709/226 |
| 6,374,300 B2 * | 4/2002 | Masters ......................... 709/229 |
| 6,438,652 B1 * | 8/2002 | Jordan et al. .................. 711/120 |
| 6,442,165 B1 * | 8/2002 | Sitaraman et al. .......... 370/395.4 |
| 6,571,277 B1 * | 5/2003 | Daniels-Barnes et al. .... 709/213 |
| 6,577,622 B1 * | 6/2003 | Schuster et al. .............. 370/352 |
| 6,601,084 B1 * | 7/2003 | Bhaskaran et al. ........... 718/105 |
| 6,665,702 B1 * | 12/2003 | Zisapel et al. ................ 718/105 |
| 6,680,947 B1 * | 1/2004 | Denecheau et al. .......... 370/396 |
| 6,744,877 B1 * | 6/2004 | Edwards .................. 379/265.02 |
| 6,795,867 B1 * | 9/2004 | Ma et al. ........................ 709/240 |
| 6,816,898 B1 * | 11/2004 | Scarpelli et al. .............. 709/224 |
| 6,829,347 B1 * | 12/2004 | Odiaka .................... 379/220.01 |
| 6,877,043 B2 * | 4/2005 | Mallory et al. ............... 709/251 |
| 6,914,897 B1 * | 7/2005 | Schuster et al. .............. 709/218 |
| 6,928,477 B1 * | 8/2005 | Leymann et al. ............. 709/226 |
| 6,938,096 B1 * | 8/2005 | Greschler et al. ............. 709/239 |
| 6,988,143 B2 * | 1/2006 | O'Neill et al. ................ 709/230 |
| 7,020,707 B2 * | 3/2006 | Sternagle ....................... 709/230 |
| 7,024,688 B1 * | 4/2006 | Faccin et al. ...................... 726/4 |
| 7,028,092 B2 * | 4/2006 | MeLampy et al. ........... 709/230 |
| 7,065,043 B2 * | 6/2006 | Wu et al. ........................ 370/229 |
| 7,068,655 B2 * | 6/2006 | March et al. .................. 370/392 |
| 7,082,122 B2 * | 7/2006 | Pan ................................. 370/352 |
| 7,099,301 B1 * | 8/2006 | Sheu .............................. 370/352 |
| 7,110,359 B1 * | 9/2006 | Acharya ........................ 370/235 |
| 7,124,173 B2 * | 10/2006 | Moriarty ....................... 709/219 |

(Continued)

FOREIGN PATENT DOCUMENTS

EP  1137236  A1 *  9/2001

OTHER PUBLICATIONS

Leu, J. et al. Design and Implementation of a Low Cost DNS-Based Load Balancing Solution for the SIP-Based VoIP Service, Dec. 9-12, 2008, IEEE, Asia-Pacific Services Computing Conference, 2008, pp. 310-314.*

(Continued)

*Primary Examiner* — Wing F Chan
*Assistant Examiner* — Alicia Baturay

(57) ABSTRACT

A system and method of load balancing in an upstream proxy. Information is received from a plurality of downstream proxies. A list of downstream proxies is maintained. Weights are assigned to each of the downstream proxies in the list, the weight based upon information received from the downstream proxies.

8 Claims, 5 Drawing Sheets

U.S. PATENT DOCUMENTS

| | | | |
|---|---|---|---|
| 7,139,713 B2 * | 11/2006 | Falcon et al. | 709/219 |
| 7,155,515 B1 * | 12/2006 | Brown et al. | 709/226 |
| 7,243,162 B2 * | 7/2007 | O'Neill et al. | 709/245 |
| 2001/0034752 A1 * | 10/2001 | Kremien | 709/105 |
| 2001/0039585 A1 * | 11/2001 | Primak et al. | 709/228 |
| 2002/0032777 A1 * | 3/2002 | Kawata et al. | 709/226 |
| 2002/0048360 A1 * | 4/2002 | Zambre et al. | 379/229 |
| 2002/0051464 A1 * | 5/2002 | Sin et al. | 370/466 |
| 2002/0107962 A1 * | 8/2002 | Richter et al. | 709/225 |
| 2002/0112073 A1 * | 8/2002 | MeLampy et al. | 709/227 |
| 2002/0181507 A1 * | 12/2002 | Jones | 370/474 |
| 2003/0009561 A1 * | 1/2003 | Sollee | 709/227 |
| 2003/0023877 A1 * | 1/2003 | Luther et al. | 713/201 |
| 2003/0035529 A1 * | 2/2003 | Baker | 379/211.02 |
| 2003/0051226 A1 * | 3/2003 | Zimmer et al. | 717/102 |
| 2003/0056002 A1 * | 3/2003 | Trethewey | 709/238 |
| 2003/0074452 A1 * | 4/2003 | Zheng et al. | 709/228 |
| 2003/0208601 A1 * | 11/2003 | Campbell et al. | 709/227 |
| 2008/0282254 A1 * | 11/2008 | Blander et al. | 718/105 |

OTHER PUBLICATIONS

Donovan, SIP Session Timer, Feb. 1999, Internet Engineering Task Force, pp. 1-6.*

International Telecommunication Union, "Packet-Based Multimedia Communications Systems", H.323, Feb. 1998, pp. i-114.

Handley et al., "SIP: Session Initiation Protocol", RFC 2543, Mar. 1999, pp. 1-153.

* cited by examiner

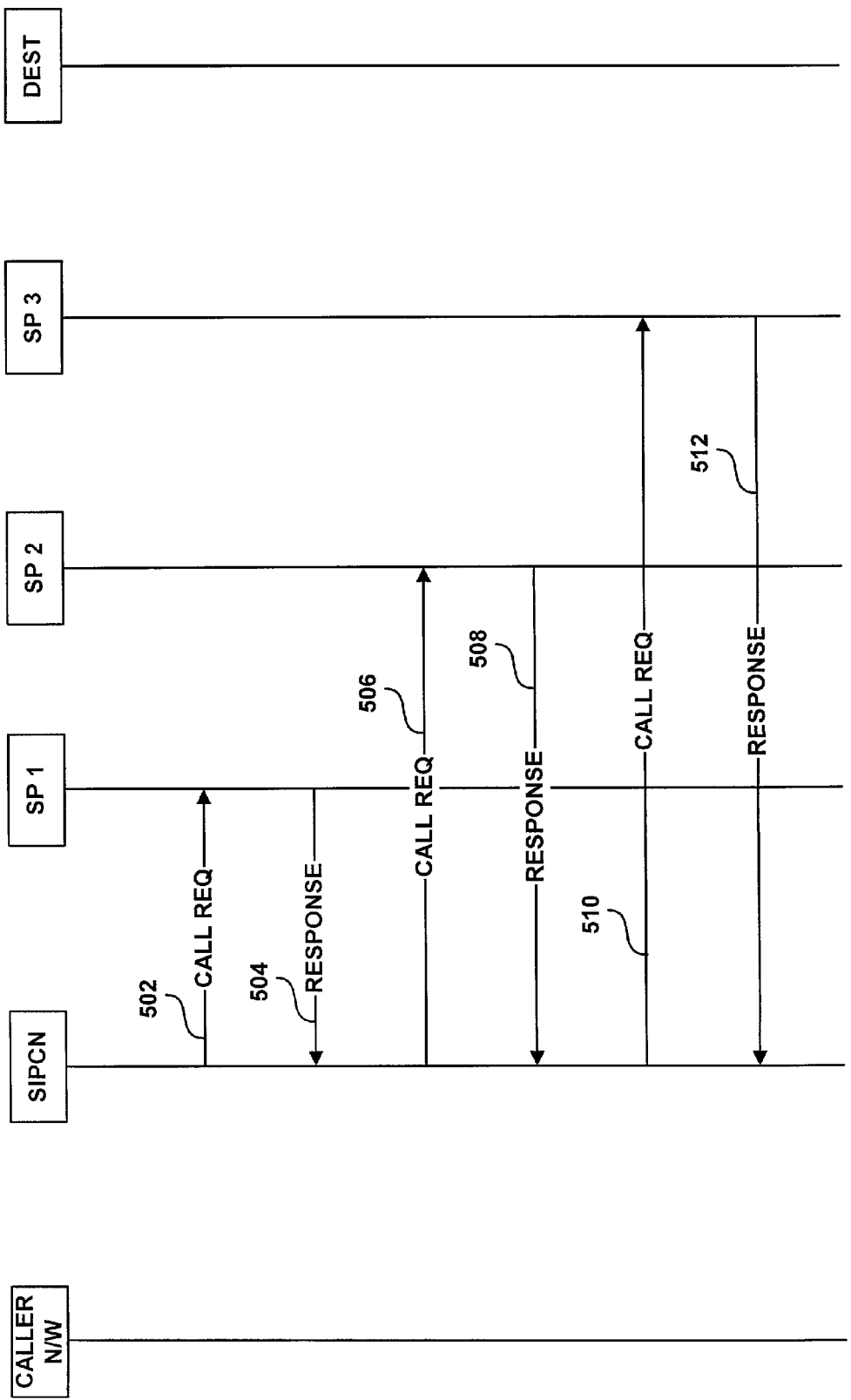

METHOD AND SYSTEM FOR LOAD BALANCING

FIELD OF THE INVENTION

This present invention relates to load balancing. More specifically, it relates to using a proxy server to provide load balancing.

BACKGROUND OF THE INVENTION

The Voice over Internet Protocol (VoIP) is a technique where voice information is packetized and transmitted over a network. VoIP uses signaling to establish, modify, and terminate multimedia events. For example, the Session to Initiation Protocol (SIP) and H.323 represent two methods whereby signaling may be provided.

SIP is an application-layer call control protocol for VoIP and other media applications. The SIP may use redirect and proxy servers. Redirect servers may be used to receive a request from a caller; determine an appropriate destination for the request; and inform the caller of the destination.

Proxy servers may be used to receive a request from a caller and forward the request to the appropriate destination. Proxy servers may be stateless and stateful, and may stay in the call path for the duration of the session, or may allow the source and destination to communicate directly, after an initial proxied message.

In carrier class networks, arrays of SIP proxy servers may be used for increased call capacity and redundancy. However, load balancing preferably occurs between servers so that no one server is significantly loaded than other servers.

SUMMARY OF THE INVENTION

The system and method of the present invention advantageously provides a system for load balancing. Specifically, a control node may be provided that balances the traffic load sent to proxies in a network. The control node may maintain information that assigns the traffic load to the proxies.

In one example of the present invention, a control node is coupled to a plurality of proxies. The control node may receive information from the plurality of proxies, maintain a list of all proxies, and assigns a weight to each of the proxies in the list, the weight based upon information received from the proxies.

The control node may receive a request and using the weights to assign a proxy. The request may then be forwarded to the selected proxy by the control node.

The information received by the control node may be indicative of the traffic load on the downstream proxy. Processes of downstream proxies may be queried to determine the load. In another example, the load may be indicated by varied latency in the response if the downstream proxies.

The foregoing and other features and advantages of the system and method for load balancing will be apparent from the following more particular description of preferred embodiments of the system and method as illustrated in the accompanying drawings.

BRIEF DESCRIPTION OF THE DRAWINGS

Preferred embodiments of the present inventions are described with reference to the following drawings, wherein:

FIG. 5 shows a diagram illustrating response-based monitoring in accordance with a preferred embodiment of the present invention.

DETAILED DESCRIPTION OF PREFERRED EMBODIMENTS

Figure 1:
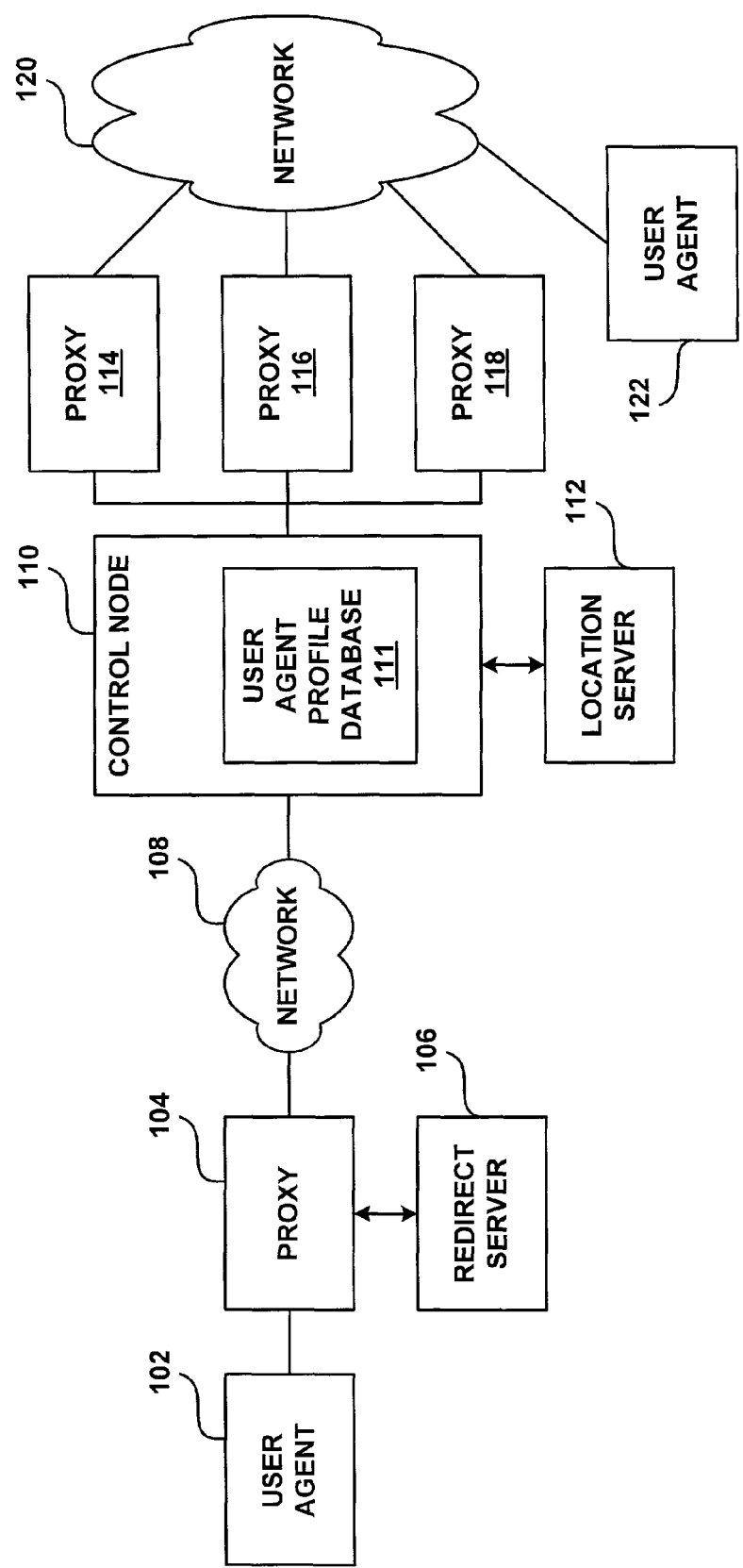
FIG. 1 is a diagram illustrating a preferred embodiment of the system for load balancing in accordance with the present invention.

Referring now to FIG. 1, a system includes a user agent 102, a first proxy 104, a redirect server 106, a network 108, a control node 110 (including a user agent profile database 111), a location server 112, a second proxy 114, third proxy 116, fourth proxy 118, a network 120, and a user agent 122.

The user agent 102 is coupled to the proxy 104. The proxy 104 is coupled to the network 108 and the redirect server 106. The network 108 is coupled to the control node 110. The control node 110 is coupled to the proxies 114, 116, 118, and the location server 112. The proxies 114, 116, and 118 are coupled to the network 120. The network 120 is coupled to the user agent 122.

The functions of the user agents 102 and 122 may be implemented by computer instructions stored in memory and executed by a processor. A user agent (caller) may transmit messages to another agent (callee). The messages may be of any type or format.

The functions of the proxies 104, 114, 116, and 118 may be implemented using computer instructions stored in a memory and executed by a processor. The proxies 104, 114, 116, and 118 may be stateless or stateful. Also, the proxies 104, 114, 116, and 118 may stay in the path of a call for the duration of a session or may be out of the path. In addition, the proxies may implement SIP or any other type of protocol.

Any of the proxies 104, 114, 116, or 118 may route messages to other proxies or other devices. A downstream proxy (e.g., proxies 114, 116, or 118) may receive messages from other proxies (e.g., upstream proxies) or other devices (e.g., the SIPCN).

The functions of the redirect server 106 may be implemented using computer instructions stored in a memory and executed by a processor. The redirect server 106 includes information needed to route calls from the caller to the callee across the network 108.

The networks 108 and 120 may be any type of network used to transmit any type of information. In one example, the networks 108 and 120 may be IP networks, which transmit packets of information. Other types of networks are possible.

The functions of the control node 110 may be implemented using computer instructions stored in a memory and executed by a processor. A list of all downstream proxies is kept on the control node. Each of the proxies may be weighted using the information available to the control node 110. Once the weighting is performed, messages may be assigned to proxies based upon the weighted values.

Weighting may be done by any number of methods. For example, weighting may be done by tracking the traffic load of the proxies; by determining the load on the proxies by tracking the delay in the responses of the proxies; or by monitoring the load on the proxies by querying specific processes of the proxies. Other types of weighting algorithms may also be used.

The user agent profile database 111 may include a list of all downstream proxies with associated weighting information. The user agent profile database 111 may be used by the control node 110 to perform load balancing, as described elsewhere in this specification.

The functions of the location server 112 may be implemented using computer instructions stored in a memory and executed by a processor. The location server 112 may receive queries from the control node 110. The location server 112, upon receiving the query, may look-up the proxy server 114, 116, or 118. The location server 112 may also use predetermined policies to determine the current telephone number of the user.

In one example of the operation of FIG. 1, the proxies 114, 116, and 118 are SIP proxies (SPs). The control node 110 may gather information about the downstream proxies 114, 116, and 118. The control node 110 may act as a redirect server. A SP Table in the user agent profile database 111 may include a list of all the downstream proxies, and each of the downstream proxies 114, 116, and 118 in the list may be weighted based upon information available.

The proxies 114, 116, and 118 may be selected by the control node 110 either using active or passive load balancing. Passive load balancing may be performed and may, for example, include round-robin algorithms. In this method, incoming requests are always sent to the next available proxy.

Active schemes may be used to gather the SP load information for the control node. For instance, Simple Network Management Protocol (SNMP) messages may be used by a proxy to tell the control node of the current load of the proxy. The response to the statistics request (made by SNMP or an alternate mechanism) may contribute to a weight value assigned to each of the proxies. Requests of the control node may then be forwarded to the proxy based upon the weight factor of the proxy.

Figure 2:
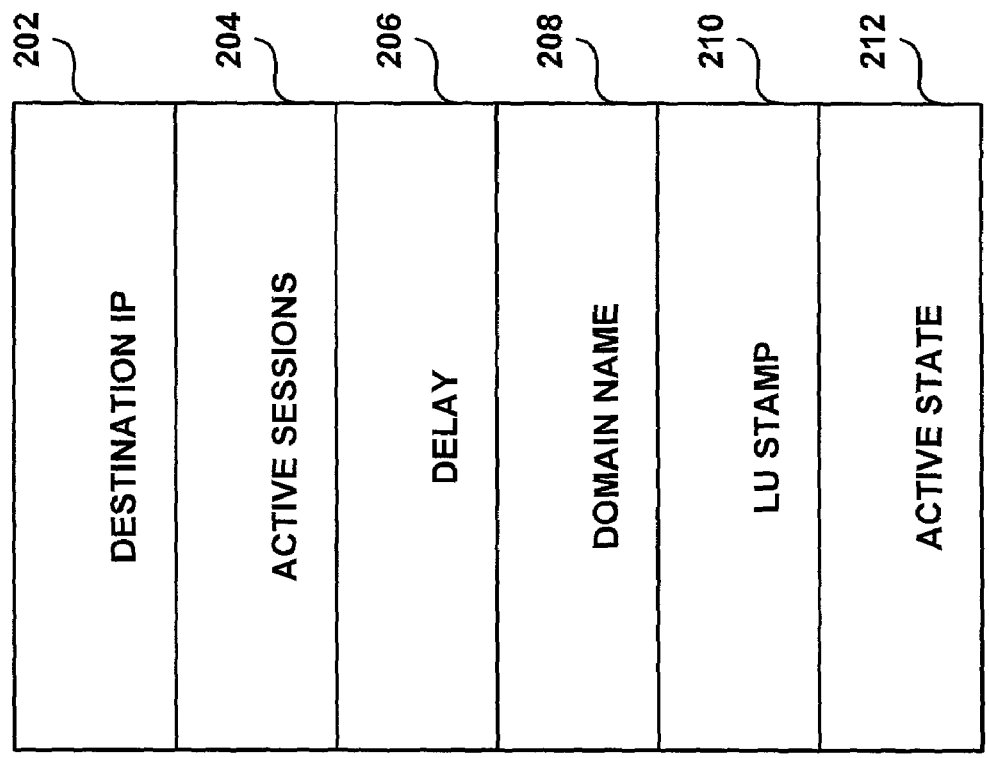
FIG. 2 is a diagram illustrating a record in a database in accordance with a preferred embodiment of the present invention.

Referring now to FIG. 2, one example of a SIP record in the database of a control node (e.g., a SIPCN) is described. The SP table in the database may include a plurality of these records. The record includes a Destination IP field 202, an active sessions field 204, a delay field 206, a domain name field 208, an LU stamp field 210, and an active state field 212. Other fields may also be used.

The record includes a Destination IP field 202 represents the IP address of the destination proxy.

The active sessions field 204 represents a count of the number of active sessions on the SP.

The delay field 206 represents the current delay time between the SIP Control node and the SIP proxy. For example, this value may be in milliseconds.

The domain name field 208 represents the domain name of the SIP proxy.

The LU stamp field 210 represents the last time where the record was updated.

The active state field 212 represents the status of the SIP proxy. For example, the status may be alive or dead. Other states may also be defined.

Figure 3:
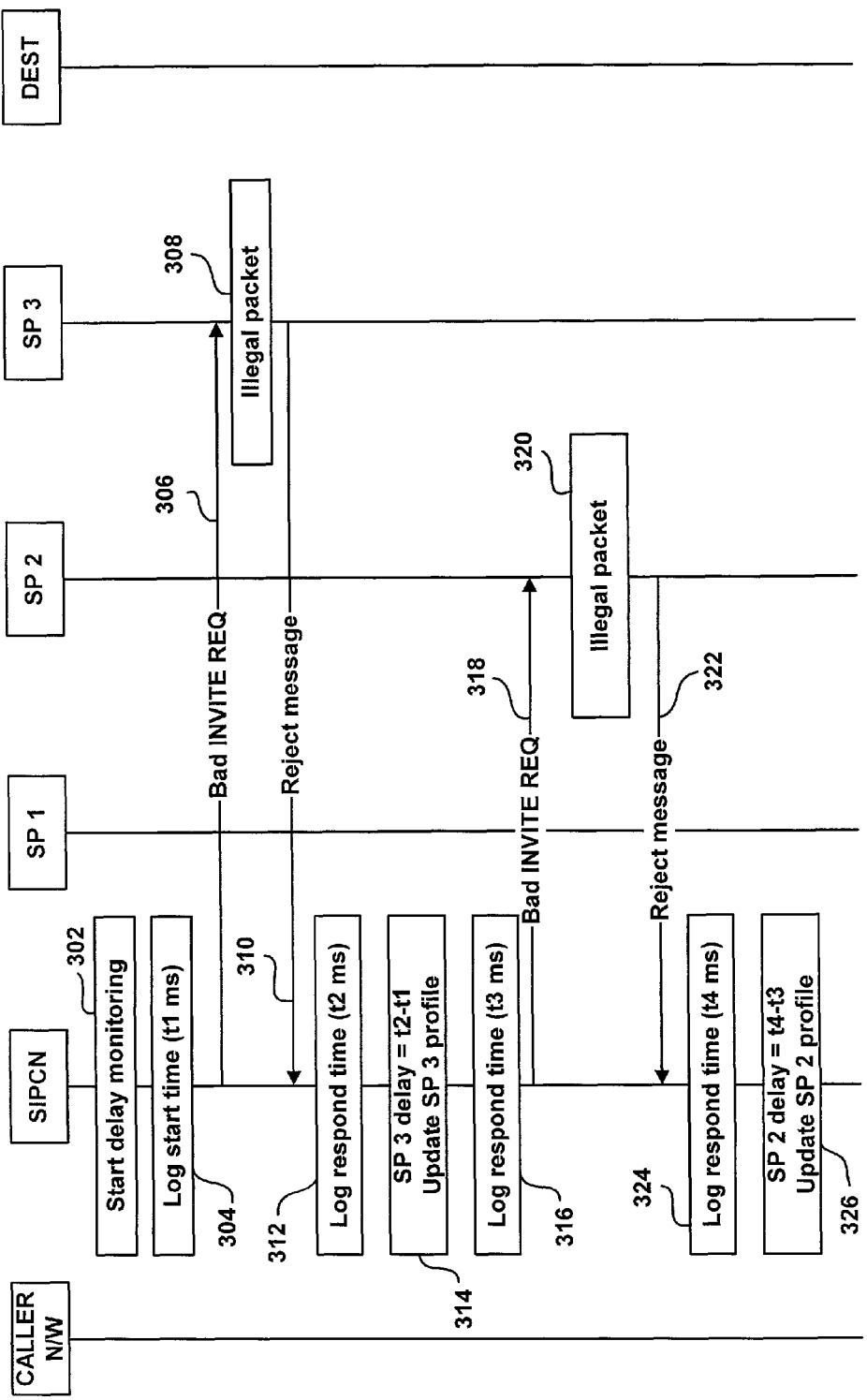
FIG. 3 is a diagram illustrating delay-based weighting in accordance with a preferred embodiment of the present invention.

Referring now to FIG. 3, one example of a delay-based weighting method is described. In this example, and the examples of FIGS. 4 and 5, a control node (SIPCN) is coupled to three proxies (SP 1, SP 2, and SP 3). A caller on a network (caller N/W) is coupled to the SIPCN. The SPs are coupled to a destination (DEST).

At step 302, the control node (SIPCN) begins delay monitoring. At step 304, the SIPCN logs a start time and stores the start time in memory. For example, the start time may be t1 microseconds (ms). At step 306, an invalid invite message is sent from the SIPCN to SP 3. The invalid message is sent as a test or "dummy" message.

At step 308, SP 3 detects that an illegal packet has been sent to SP 3 from the SIPCN. At step 310, SP 3 transmits a reject message to the SIPCN. At step 312, the SIPCN logs a response time, for example, t2 ms. At step 314, the SIPCN uses the calculation that the delay for the response from SP 3=t2−t1. This delay value may be designated as Delay(SP3). The SIPCN may also update the SP 3 profile (in the database). At step 316, the SIPCN logs a start time and stores the start time in memory. For example, the start time may be t3 ms. At step 318, another "bad" INVITE request is sent from the SIPCN to SP 2. At step 320, SP 2 determines that the message is an illegal packet. At step 322, a REJECT message is sent from SP 2 to the SIPCN. At step 324, the SIPCN logs the response time, for example, at t4 ms. At step 326, the delay in response from SP 2 is calculated according to SP 2 delay=t4−t3 and the SP 2 profile (in the database) may be updated. This delay value may be designated Delay(SP2). Based on the values Delay(SP3) and Delay(SP2) appropriate action may be taken. In one example, Delay(SP2) might be greater than Delay(SP3). This may indicate that a higher weight should be assigned to the larger delay. Therefore Delay(SP3) may have a higher weight than Delay(SP2). Further, it may be determined, for example, by algorithms on the SIPCN, that higher weights indicate a more loaded proxy. The SIPCN may, therefore, make the decision to reduce the number of calls directed to SP3 in comparison to SP2. The factor by which the traffic is reduced to any specific proxy by the SIPCN may, in one instance, be based on the differences in response times. Thus, the traffic reduction would be related to the delay values. The relationship between the delay values and the reduction in traffic may be defined by algorithms in the SIPCN processes.

Figure 4:
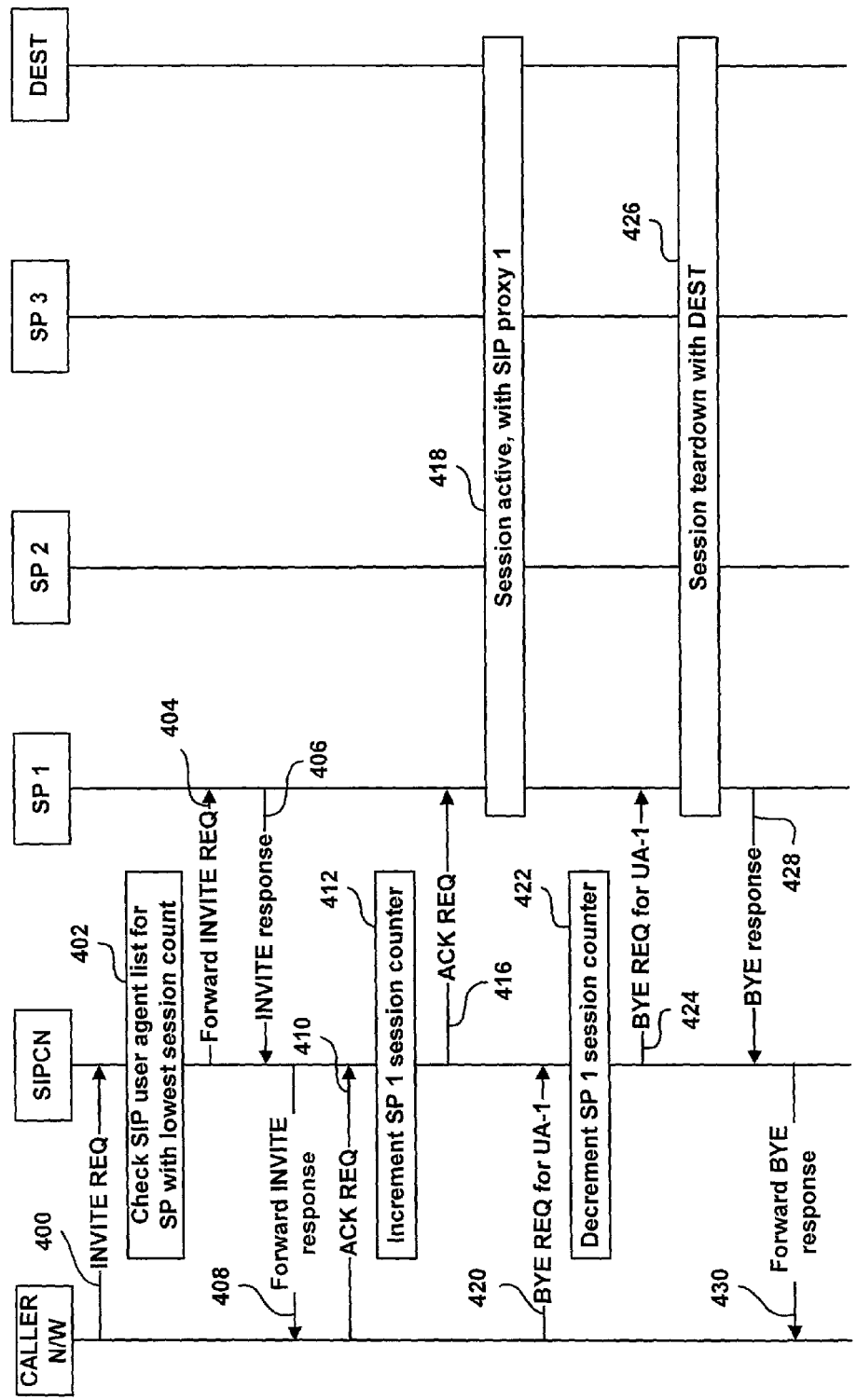
FIG. 4 shows a diagram illustrating monitoring-based weighting in accordance with a preferred embodiment of the present invention.

Referring now to FIG. 4, one example of a traffic-based weighting method is described. Each SIPCN may act as a proxy server. All traffic to the destination SPs may be siphoned through the SIPCN, which may be stateless. The load on each SP may be determined by tracking the total number of active sessions on the SP. A session may be deemed active if an ACK message was forwarded to the SP. The session may be deemed to remain active until a BYE message is forwarded to the same SP and the SP provides a response. Each SP may be weighted based upon the number of active sessions. This value may change as traffic changes. Passive weighting schemes, for example, round robin, may complement this method, for instance, when the call volume is low.

At step 400, an INVITE request is sent from a caller on the network (caller N/W) to the SIPCN. At step 402, the SIPCN checks a SIP User agent list for the SP with the lowest session count. For example, the list may be stored in the database of the SIPCN.

At step 404, the INVITE request is sent from the SIPCN to the SP 1. At step 406, an INVITE response is sent from SP 1 to the SIPCN. At step 408, the INVITE response is forwarded from the SIPCN to the caller N/W. At step 410, an acknowledgement request is sent from the caller N/W to the SIPCN. At step 412, the SIPCN increments the SP1 session counter. At step 416, the ACK request is forwarded from the SIPCN to SP 1. At step 418, a session is active with SP 1.

At step 420, a BYE request is sent from the caller N/W to the SIPCN. At step 422, the SP1 session counter is decremented. At step 424, the BYE request for SP 1 is forwarded from the SIPCN to SP 1. At step 426, a session teardown is performed between SP1 and the destination.

At step 428, a BYE response message is sent from SP 1 to the SIPCN indicating that the session has been eliminated. At step 430, the BYE response is forwarded from the SIPCN to the caller N/W.

Referring now to FIG. 5, another example of a weighting method is described. At step 502, the SIPCN sends a request to SP 1. The request may ask SP 1 the number of calls being handled by SP 1. The frequency of these requests to SP 1 (and to any other SP) may be periodic (e.g., every n seconds) or random (e.g., equally distributed probabilities between m and n seconds). The SIPCN may redirect new calls to the SP with the lowest load. At step 504, SP 1 sends a response message to the SIPCN reporting the number of calls it is currently handling.

At step 506, the SIPCN sends a request to SP 2. The request may ask SP 2 the number of calls being handled by SP 2. At step 508, SP 2 sends a response message to the SIPCN reporting the number of calls it is currently handling. At step 510, the SIPCN sends a request to SP 3. The request may ask SP 3 the number of calls being handled by SP 3. At step 512, SP 3 sends a response message to the SIPCN reporting the number of calls it is currently handling.

Alternatively, the process load on the destination host may be retrieved at regular intervals, without querying the SP for any load information. This implementation may require that the remote services be accessible, and their current CPU usage be available. For example, on Unix systems, the ps utility may be used. On Win32 systems, similar applications, such as the pslist and pulist utilities may provide this information. Weighting may be based on the current CPU load of the destination hoist, and no querying of the current SIP process may be needed.

In order to provide further flexibility in the network, pre-weighting may also be used. Pre-weighting allows the SIPCN to ensure that the SPs with lower processor capability are not overloaded. In other words, loads are distributed equitably rather than equally. The pre-weight may be manually configured by a network administrator, or may be determined dynamically via processes running on the hosts. In one example, process status utilities such as ps, pstat, pmon, pulist and pslist may be used. Pre-weighting may be implemented as a field in the SIPCN table. The field may indicate the handicap of each SP and contribute to the weighted value of the host. This would provide the benefit of allowing a variety of unequal processor hosts to be used within the same cluster, as SPs.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

It will be apparent to those of ordinary skill in the art that methods involved in the system and method for traffic load balancing may be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A method for assigning weights to a group of proxies, wherein the proxies in the group implement the SIP protocol, wherein a control node is coupled to the group of proxies and the control node maintains a threshold value, the method comprising:

sending, from the control node, a message to each of the proxies, wherein the messages sent to each of the proxies are invalid INVITE messages;

receiving a reply from each of the proxies, wherein each reply is in response to the respective message sent to the proxies, wherein the replies received from each of the proxies are REJECT messages that result from the invalid INVITE messages;

determining a delay time for each of the messages sent to each of the proxies, based on when each message is sent and when the respective reply to each message is received;

assigning a respective weight to each of the proxies based upon the delay time of the respective message sent to each respective proxy;

receiving a new call;

determining a call volume;

if the call volume is below the threshold value, assigning the new call to a first proxy of the group of proxies based on a round robin protocol; and if the call volume is above the threshold value, assigning the new call to a second proxy of the group of proxies based upon the weights assigned to each proxy.

2. The method of claim 1, wherein assigning the respective weight to each of the proxies is also based on a pre-weighting of the proxies that assigns a respective handicap to each respective proxy to account for processing capabilities of the respective proxy.

3. A system for load balancing, the system comprising:

a plurality of proxies, wherein the proxies implement the SIP protocol; and a control node coupled to the plurality of proxies, the control node receiving a new call from a user on a network, the control node including a threshold call load value, the control node including a table of weights, each of the weights associated with one of the plurality of proxies, the weights determined in part by a delay time between the control node and the proxies, wherein the delay times between the control node and each respective proxy is measured by the control node sending an INVITE message to each respective proxy, wherein the INVITE messages are invalid INVITE messages, wherein the delay times between the control node and each respective proxy are also measured by the control node receiving a REJECT message from each respective proxy, wherein the REJECT messages result from the invalid INVITE messages,
if the control node determines that call volume is below the threshold call load value, then distributing the new call to a first proxy of the plurality of proxies in a round robin fashion, if the control node determines that the call volume is above the threshold call load value then distributing the new call to a second proxy of the plurality of proxies that has the lowest weight.

4. The system of claim 3 wherein the control node receives messages from each respective proxy of the plurality of proxies, each message indicating the loading of the respective proxy, and wherein the weight for the respective proxy is also based on the loading of the respective proxy.

5. The system of claim 3, wherein the control node associates weights with the proxies also based on a pre-weighting of the proxies that assigns a respective handicap to each respective proxy to account for processing capabilities of the respective proxy.

6. A method, performed by a control node, for the control node to distribute load to a first and second proxy, wherein the first and second proxies implement the SIP protocol, and wherein the control node includes a threshold value, the method comprising:
transmitting a first message to the first proxy, receiving a first reply from the first proxy, wherein the first reply is in response to the first message, and determining a first delay time between the transmitting of the first message and the receiving of the first reply;
transmitting a second message to the second proxy, receiving a second reply from the second proxy, wherein the second reply is in response to the second message, and determining a second delay time between the transmitting of the second message and the receiving of the second reply, wherein the first message and the second message are invalid INVITE messages, and wherein the first reply and the second reply are REJECT messages that result from the invalid INVITE messages;
assigning weights to the first proxy and the second proxy based on the first delay time and the second delay time, respectively;
receiving incoming calls;
if a current call volume is below the threshold value, assigning the incoming calls to the first proxy and the second proxy based on a round robin protocol; and
if the current call volume is above the threshold value, assigning the incoming calls to the first proxy and the second proxy based on their respective weights.

7. The method of claim 6, wherein the control node assigns weights to the first proxy and the second proxy also based on a pre-weighting of the first proxy and the second proxy that assigns a respective handicap to each of the first proxy and the second proxy to account for respective processing capabilities of the first proxy and the second proxy.

8. The method of claim 6, further comprising:
querying a first process on the first proxy; and
querying a second process on the second proxy, wherein the control node assigns weights to the first proxy and the second proxy also based on information gathered from querying the first proxy and the second proxy.

* * * * *